United States Patent
Fujii et al.

(10) Patent No.: US 12,312,503 B2
(45) Date of Patent: May 27, 2025

(54) HOT MELT ADHESIVE SHEET

(71) Applicant: NITTO SHINKO CORPORATION, Sakai (JP)

(72) Inventors: Takaaki Fujii, Sakai (JP); Shun Hirata, Sakai (JP); Takaaki Yamada, Sakai (JP)

(73) Assignee: NITTO SHINKO CORPORATION, Sakai (JP)

( * ) Notice: Subject to any disclaimer, the term of this patent is extended or adjusted under 35 U.S.C. 154(b) by 266 days.

(21) Appl. No.: 17/637,566

(22) PCT Filed: Aug. 7, 2020

(86) PCT No.: PCT/JP2020/030414
§ 371 (c)(1),
(2) Date: Feb. 23, 2022

(87) PCT Pub. No.: WO2021/039364
PCT Pub. Date: Mar. 4, 2021

(65) Prior Publication Data
US 2022/0282136 A1    Sep. 8, 2022

(30) Foreign Application Priority Data

Aug. 29, 2019   (JP) .................. 2019-156834

(51) Int. Cl.
*C09J 153/02*   (2006.01)
*C09J 7/10*   (2018.01)
*C09J 7/35*   (2018.01)
*C09J 11/08*   (2006.01)

(52) U.S. Cl.
CPC .............. *C09J 153/02* (2013.01); *C09J 7/10* (2018.01); *C09J 7/35* (2018.01); *C09J 11/08* (2013.01); *C09J 2301/304* (2020.08); *C09J 2301/312* (2020.08)

(58) Field of Classification Search
None
See application file for complete search history.

(56) References Cited

U.S. PATENT DOCUMENTS

| | | | | |
|---|---|---|---|---|
| 2006/0241235 A1* | 10/2006 | Givord | ................. | C09J 153/025 524/474 |
| 2008/0306214 A1 | 12/2008 | Kanderski | | |
| 2010/0264369 A1* | 10/2010 | Zhang | ..................... | A61L 15/56 252/301.35 |
| 2011/0229721 A1 | 9/2011 | Hoch et al. | | |
| 2015/0203725 A1* | 7/2015 | Stafeil | ................... | C09J 153/02 524/505 |
| 2019/0040289 A1* | 2/2019 | Dobashi | .................. | F21S 45/50 |
| 2019/0249045 A1* | 8/2019 | Fujita | .................. | A61F 13/5605 |
| 2020/0157326 A1 | 5/2020 | Morishita | | |
| 2020/0255712 A1 | 8/2020 | Yamauchi et al. | | |
| 2020/0283616 A1 | 9/2020 | Tsuno et al. | | |
| 2022/0145142 A1 | 5/2022 | Dobashi et al. | | |

FOREIGN PATENT DOCUMENTS

| | | | |
|---|---|---|---|
| CN | 1861729 | A | 11/2006 |
| CN | 101684398 | A | 3/2010 |
| EP | 1700895 | A1 | 9/2006 |
| JP | H03-160083 | A | 7/1991 |
| JP | H08-60121 | A | 3/1996 |
| JP | H11-198288 | A | 7/1999 |
| JP | 2000-136367 | A | 5/2000 |
| JP | 2006-249433 | A | 9/2006 |
| JP | 2010-530905 | A | 9/2010 |
| JP | 2011190287 | A * | 9/2011 |
| JP | 2016-098238 | A | 5/2016 |
| JP | 2017-066303 | A | 4/2017 |
| JP | 2017-214479 | A | 12/2017 |
| JP | 2018-053077 | A | 4/2018 |
| JP | 2018-150462 | A | 9/2018 |
| KR | 20060097673 | A | 9/2006 |
| KR | 20190015212 | A | 2/2019 |
| WO | 2019/026891 | A1 | 2/2019 |
| WO | 2019/031290 | A1 | 2/2019 |
| WO | 2019/107461 | A1 | 6/2019 |

OTHER PUBLICATIONS

JP-2011190287-A, Sep. 2011 (Year: 2011).*
https://www.exxonmobilchemical.com/en/chemicals/webapi/dps/v1/datasheets/150000000434/0/en, Apr. 2020 (Year: 2020).*
Office Action dated Feb. 12, 2023, issued in counterpart CN application No. 202080060835.X, with English translation. (11 pages).

(Continued)

*Primary Examiner* — Satya B Sastri
(74) *Attorney, Agent, or Firm* — WHDA, LLP

(57) ABSTRACT

The present invention is a hot melt adhesive sheet including an adhesive layer including a hot melt adhesive, in which the hot melt adhesive includes either a styrene-ethylene-ethylene-propylene-styrene block copolymer or a styrene-ethylene-propylene-styrene block copolymer, and a hydrogenated alicyclic hydrocarbon petroleum resin, and the hot melt adhesive sheet has a glass transition temperature falling within a range of −10° C. or more and 10° C. or less.

4 Claims, No Drawings

(56) References Cited

OTHER PUBLICATIONS

Office Action dated Jul. 14, 2023, issued in counterpart JP Application No. 2019-156834, with English translation. (6 pages).
Extended (Supplementary)European Search Report dated Aug. 24, 2023, issued in counterpart EP Application No. 20858171.0. (13 pages).
Database WPI, Week 201572, Oct. 22, 2015, Thomson Scientific, London, GB; AN 2015-636060, XP002809944 (3 pages); cited in the Extended (Supplementary)European Search Report dated Aug. 24, 2023.
Notification of Transmittal of Translation of the International Preliminary Report on Patentability (Form PCTIB/338) issued in counterpart International Application No. PCT/JP2020/030414 mailed Mar. 10, 2022, with Forms PCT/IB/373 and PCT/ISA/237. (13 pages).
International Search Report dated Oct. 13, 2020, issued in counterpart Application No. PCT/JP2020/030414. (3 pages).
Office Action dated Dec. 17, 2024, issued in counterpart KR Application No. 10-2022-7008331, with English translation. (12 pages).
Datasheet, Escorez 5320, Tackifying Resin, ExonMobil., Apr. 20, 2020 (2 pages); cited in KR Office Action dated Dec. 17, 2024.

* cited by examiner

HOT MELT ADHESIVE SHEET

CROSS-REFERENCE TO RELATED APPLICATION

This application claims priority to Japanese Patent Application No. 2019-156834, the disclosure of which is incorporated herein by reference in its entirety.

FIELD

The present invention relates to a hot melt adhesive sheet.

BACKGROUND

Conventionally, a hot melt adhesive sheet is used for, for example, attaching automotive parts to each other and attaching electronic components to each other. For example, the holt melt adhesive sheet is used for attaching a door molding to a car door.

Known as such a hot melt adhesive sheets is a hot melt adhesive sheet that includes an adhesive layer including a hot melt adhesive, the adhesive layer including, as a styrene-based thermoplastic elastomer, at least one of a styrene-(ethylene-propylene)-styrene block copolymer (SEPS), a styrene-ethylene-(ethylene-propylene)-styrene block copolymer (SEEPS), and a styrene-(ethylene-butadiene)-styrene block copolymer (SEBS) (for example, Patent Literature 1).

In recent years, in automobile field, an aluminum alloy is increasingly used as a material of a vehicle body or a door in order to reduce the vehicle weight.

CITATION LIST

Patent Literature

Patent Literature 1: JP 2011-190287 A

SUMMARY

Technical Problem

A hot melt adhesive sheet is designed to attach the parts to each other by an adhesive layer that is molten by application of heat (for example, at a temperature of 80 to 100° C.), followed by cooling to normal temperature (for example, at a temperature of 23° C.) to be solidified. However, when an adhesive layer including a styrene-based thermoplastic elastomer as described in Patent Literature 1 is used for attaching a door molding to a door made of an aluminum alloy, the door and the door molding sometimes cannot be sufficiently attached together even in the case where they are solidified by cooling to normal temperature. There is thus a demand for a hot melt adhesive sheet having a relatively high adhesion to an adherend including aluminum, but consideration on such a demand is rarely made.

Therefore, it is an object of the present invention to provide a hot melt adhesive sheet that has a relatively high adhesion to an adherend including aluminum.

Solution to Problem

A hot melt adhesive sheet according to the present invention is a hot melt adhesive sheet including an adhesive layer including a hot melt adhesive, in which the hot melt adhesive includes either a styrene-ethylene-ethylene-propylene-styrene block copolymer or a styrene-ethylene-propylene-styrene block copolymer, and a hydrogenated alicyclic hydrocarbon petroleum resin, and the hot melt adhesive sheet has a glass transition temperature falling within a range of −10° C. or more and 10° C. or less.

In the hot melt adhesive sheet, a styrene content in the styrene-ethylene-ethylene-propylene-styrene block copolymer can be 15 mass % or more.

In the hot melt adhesive sheet, a styrene content in the styrene-ethylene-propylene-styrene block copolymer can be 15 mass % or more.

In the hot melt adhesive sheet, the hot melt adhesive can include 20 mass parts or more and 80 mass parts or less of the hydrogenated alicyclic hydrocarbon petroleum resin based on 100 mass parts of either the styrene-ethylene-ethylene-propylene-styrene block copolymer or the styrene-ethylene-propylene-styrene block copolymer.

In the hot melt adhesive sheet, a softening point of the hydrogenated alicyclic hydrocarbon petroleum resin can be 140° C. or less.

In the hot melt adhesive sheet, the hot melt adhesive can further include a terpene modified phenol resin.

In the hot melt adhesive sheet, a softening point of the terpene modified phenol resin can be 100° C. or more.

In the hot melt adhesive sheet, the hot melt adhesive can include 3 mass parts or more and 15 mass parts or less of the terpene modified phenol resin based on 100 mass parts of either the styrene-ethylene-ethylene-propylene-styrene block copolymer or the styrene-ethylene-propylene-styrene block copolymer.

DESCRIPTION OF EMBODIMENTS

Hereinafter, an embodiment of the present invention will be described.

A hot melt adhesive sheet according to this embodiment has a two-layered structure including a base layer formed of a polymer sheet, and an adhesive layer that is provided on one side of the base layer and configured to be bonded to an adherend. In the case where two adherends are bonded to each other using a hot melt adhesive sheet having the two-layered structure as aforementioned, the hot melt adhesive sheet can be used by, for example, being folded to have the adhesive layer facing outward to form two adhesive surfaces facing outward in the hot melt adhesive sheet.

In the hot melt adhesive sheet according to this embodiment, the adhesive layer is formed of the hot melt adhesive. In the hot melt adhesive sheet according to this embodiment, it is important that the hot melt adhesive includes either a styrene-ethylene-ethylene-propylene-styrene block copolymer (SEEPS) or a styrene-ethylene-propylene-styrene block copolymer (SEPS), and a hydrogenated alicyclic hydrocarbon petroleum resin as a tackifier, and a glass transition temperature of the hot melt adhesive sheet falls within a range of −10° C. or more and 10° C. or less. This configuration enables the hot melt adhesive sheet to have a relatively high adhesion to the adherend including aluminum.

Although it is unclear why the adhesive layer of the hot melt adhesive sheet according to this embodiment has a relatively high adhesion to the adherend including aluminum, the present inventors presume that the hot melt adhesive sheet according to the present invention configured to have the adhesive layer including either a SEEPS or a SEPS and a hydrogenated alicyclic hydrocarbon petroleum resin, and have a glass transition temperature falling within a range of −10° C. or more and 10° C. or less, causes the adhesive layer in a molten state to have an improved wettability to the adherend including aluminum, compared with a hot melt adhesive sheet without such a configuration, which could be a contributor.

The styrene-ethylene-ethylene-propylene-styrene block copolymer (SEEPS) includes a hard segment composed of a polystyrene block and a soft segment composed of a constituent unit derived from propylene. More specifically, the SEEPS includes hard segments on both ends of the basic structure, and the soft segment between these two hard segments. This configuration enables the adhesive layer to have an excellent adhesion to a polyolefin-based resin (for example, polypropylene) used as a material for a polymer sheet.

The SEEPS preferably has the hard segment at a ratio equal to or a higher than a certain ratio in terms of enabling the adhesive layer to exhibit a high cohesive force. On the other hand, the content of the hard segment in the SEEPS is preferably equal to or less than a certain value since the affinity for the polyolefin-based resin such as a polypropylene resin is mainly exhibited by a soft segment. More specifically, a styrene content in the SEEPS is preferably 15 mass % or more, more preferably 18 mass % or more, still more preferably 20 mass % or more. The styrene content in the SEEPS is preferably 40 mass % or less, more preferably 35 mass % or less, still more preferably 32 mass % or less.

A mass average molecular weight of the SEEPS is preferably 100,000 or more, more preferably 150,000 or more. The mass average molecular weight of the SEEPS is preferably 400,000 or less, more preferably 380,000 or less. The mass average molecular weight herein means a mass average molecular weight determined by gel permeation chromatography measurement (GPC) in terms of styrene.

The styrene-ethylene-propylene-styrene block copolymer (SEPS) includes hard segments on both ends of the basic structure, and the soft segment between these two hard segments in the same manner as the styrene-ethylene-ethylene-propylene-styrene block copolymer (SEEPS).

The styrene content in the SEPS is preferably 15 mass % or more, more preferably 18 mass % or more, still more preferably 20 mass % or more. The styrene content in the SEPS is preferably 40 mass % or less, more preferably 35 mass % or less, still more preferably 32 mass % or less.

The mass average molecular weight of the SEPS is preferably 100,000 or more, more preferably 150,000 or more. The mass average molecular weight of the SEPS is preferably 400,000 or less, more preferably 380,000 or less.

The hot melt adhesive sheet according to this embodiment includes either the styrene-ethylene-ethylene-propylene-styrene block copolymer (SEEPS) or the styrene-ethylene-propylene-styrene block copolymer (SEPS) in a total amount of preferably 30 mass % or more and 80 mass % or less, more preferably 50 mass % or more and 70 mass % or less.

The glass transition temperature (Tg) of the hot melt adhesive sheet according to this embodiment can be measured using, for example, a viscoelasticity measuring device (Model No. MCR 302 manufactured by Anton Paar Japan K.K.). More specifically, a test specimen is applied with a load of 10N under an air atmosphere and measurement is made using the viscoelasticity measuring device in the conditions of heating with a frequency of 1 Hz, a strain of 0.1%, and at a heating rate of 5° C./min within a temperature range between −70° C. and 200° C., to obtain a glass transition temperature (Tg) from a position of tanδ peak. In the case where some tanδ peaks can be found, the glass transition temperature (Tg) is obtained from the position of the highest peak.

The hydrogenated alicyclic hydrocarbon petroleum resin is preferably hydrogenated to have an unsaturated bond sufficiently eliminated, and is preferably brought into a state that it can be referred to as an alicyclic saturated hydrocarbon resin. Specifically, in the hydrogenated alicyclic hydrocarbon petroleum resin, the iodine value measured according to JIS K 0070-1992 "test methods of acid value, saponification value, ester value, iodine value, hydroxyl value and unsaponifiable matter of chemical products" is preferably 15 g/100 or less, more preferably 10 g/100 or less.

The softening point of the hydrogenated alicyclic hydrocarbon petroleum resin is preferably 140° C. or less, more preferably 130° C. or less, still more preferably 120° C. or less, particularly preferably 95° C. or more and 120° C. or less. In this embodiment, the softening point can be measured by "the softening point method (ring and ball method)" defined in, for example, "petroleum asphalt" according to JIS K 2207-1996.

The hot melt adhesive sheet includes preferably 20 mass parts or more and 80 mass parts or less, more preferably 40 mass parts or more and 80 mass parts or less of the hydrogenated hydrocarbon petroleum resin based on 100 mass parts of either the styrene-ethylene-ethylene-propylene-styrene block copolymer (SEEPS) or the styrene-ethylene-propylene-styrene block copolymer (SEPS).

The hot melt adhesive preferably further includes a terpene modified phenol resin as a tackifier. Further inclusion of the terpene modified phenol resin in the hot melt adhesive enables the hot melt adhesive sheet according to this embodiment to have higher adhesion to the adherend including aluminum. Also, the hot melt adhesive sheet becomes excellent in high temperature adhesion.

The softening point of the terpene modified phenol resin is preferably 100° C. or more, more preferably 120° C. or more, still more preferably 120° C. or more and 150° C. or less, particularly preferably 120° C. or more and 140° C. or less.

The hot melt adhesive sheet includes preferably 3 mass parts or more, more preferably 5 mass parts or more of the terpene modified phenol resin based on 100 mass parts of either the styrene-ethylene-ethylene-propylene-styrene block copolymer (SEEPS) or the styrene-ethylene-propylene-styrene block copolymer (SEPS). The hot melt adhesive sheet includes preferably 15 mass parts or less, more preferably 12 mass parts or less of the terpene modified phenol resin based on 100 mass parts of either the styrene-ethylene-ethylene-propylene-styrene block copolymer (SEEPS) or the styrene-ethylene-propylene-styrene block copolymer (SEPS).

The hot melt adhesive can include a general thermoplastic resin, a general thermosetting resin, an inorganic filler, or a chemical agent.

Examples of the inorganic filler include silicon oxide, aluminum oxide, silicon nitride, aluminum nitride, and boron nitride.

Examples of the chemical agent include general plastic compounding agent such as an anti-aging agent, an antioxidant, a flame retardant, a filler, and a colorant.

The peel strength of the hot melt adhesive sheet according to this embodiment at a room temperature (23° C.) when the adherend is an aluminum plate is preferably 2 N/10 mm or more, more preferably 5 N/10 mm or more, still more preferably 6 N/10 mm or more. The peel strength at a room temperature when the adherend is an aluminum plate can be determined by a method described in Examples below.

In the case where the hot melt adhesive sheet includes, as a styrene-based block copolymer, both of the styrene-ethylene-ethylene-propylene-styrene block copolymer (SEEPS) and the styrene-ethylene-propylene-styrene block copolymer (SEPS), the mixing ratio of the styrene-ethylene-ethylene-propylene-styrene block copolymer (SEEPS) and the styrene-ethylene-propylene-styrene block copolymer (SEPS) (i.e., SEEPS:SEPS) is preferably 30:70 to 70:30, more preferably 40:60 to 60:40, still more preferably 45:55 to 55:45, optimally 50:50.

The hot melt adhesive sheet according to this embodiment is configured as above, and thus has advantageous effects as below.

That is, the hot melt adhesive sheet according to this embodiment is a hot melt adhesive sheet including an adhesive layer comprising a hot melt adhesive, in which the hot melt adhesive includes either a styrene-ethylene-ethylene-propylene-styrene block copolymer or a styrene-ethylene-propylene-styrene block copolymer, and a hydrogenated alicyclic hydrocarbon petroleum resin, and the hot melt adhesive sheet having a glass transition temperature falling within a range of −10° C. or more and 10° C. or less.

According to this configuration, the hot melt adhesive sheet can have a relatively high adhesion to the adherend including aluminum.

In the hot melt adhesive sheet according to this embodiment, a styrene content in the styrene-ethylene-ethylene-propylene-styrene block copolymer can be 15 mass % or more.

According to this configuration, the hot melt adhesive sheet can have an even higher adhesion to the adherend including aluminum.

In the hot melt adhesive sheet according to this embodiment, a styrene content in the styrene-ethylene-propylene-styrene block copolymer can be 15 mass % or more.

According to this configuration, the hot melt adhesive sheet can have an even higher adhesion to the adherend including aluminum.

In the hot melt adhesive sheet according to this embodiment, the hot melt adhesive can include 20 mass parts or more and 80 mass parts or less of the hydrogenated alicyclic hydrocarbon petroleum resin based on 100 mass parts of either the styrene-ethylene-ethylene-propylene-styrene block copolymer or the styrene-ethylene-propylene-styrene block copolymer.

According to this configuration, the hot melt adhesive sheet can have an even higher adhesion to the adherend including aluminum.

In the hot melt adhesive sheet according to this embodiment, a softening point of the hydrogenated alicyclic hydrocarbon petroleum resin can be 140° C. or less.

According to this configuration, the hot melt adhesive sheet can have an even higher adhesion to the adherend including aluminum.

In the hot melt adhesive sheet according to this embodiment, the hot melt adhesive can further include a terpene modified phenol resin.

According to this configuration, the hot melt adhesive sheet can have an even higher adhesion to the adherend including aluminum.

In the hot melt adhesive sheet according to this embodiment, a softening point of the terpene modified phenol resin can be 100° C. or more.

According to this configuration, the hot melt adhesive sheet can have an even higher adhesion to the adherend including aluminum.

In the hot melt adhesive sheet according to this embodiment, the hot melt adhesive can include 3 mass parts or more and 15 mass parts or less of the terpene modified phenol resin based on 100 mass parts of either the styrene-ethylene-ethylene-propylene-styrene block copolymer or the styrene-ethylene-propylene-styrene block copolymer.

According to this configuration, the hot melt adhesive sheet can have an even higher adhesion to the adherend including aluminum.

The hot melt adhesive sheet according to the present invention is not limited to the above embodiment. Further, the hot melt adhesive sheet according to the present invention is not limited by the abovementioned operational effects. Various modifications can be made to the hot melt adhesive sheet according to the present invention without departing from the gist of the present invention.

The above embodiment was described by taking, for example, the case where the hot melt adhesive sheet has a two-layered structure including a base layer formed of a polymer sheet, and an adhesive layer that is provided on one side of the base layer and configured to be bonded to an adherend, but the examples of forming the hot melt adhesive sheet are not limited to this case. The hot melt adhesive sheet can have a single-layered structure including only the adhesive layer or can have a three-layered structure including the base layer and the adhesive layer laminated on each of both sides of the base layer. That means the hot melt adhesive sheet according to the present invention can be formed of a single layer or a plurality of layers, and can include at least the adhesive layer. In the case where two adherends are bonded to each other using the hot melt adhesive sheet having the single-layered structure including only the adhesive layer, the adherends are respectively bonded to the adhesive surfaces of the hot melt adhesive sheet which are opposite to each other.

EXAMPLES

Next, the present invention will be further specifically described with reference to Examples and Comparative Examples. The present invention is not limited to the following examples unless the examples exceed the gist of the present invention.

Production of a Hot Melt Adhesive Sheet According to Example 1

A styrene-ethylene-ethylene-propylene-styrene block copolymer (SEEPS) as a styrene-based block copolymer and an alicyclic saturated hydrocarbon petroleum resin (a) as a hydrogenated hydrocarbon petroleum resin were included in an organic solvent in mixing amounts shown in Table 1 below to prepare a varnish. Then, the varnish was applied to a polyethylene terephthalate film (thickness: 50 μm) followed by being allowed to dry, to obtain a hot melt adhesive sheet including an adhesive layer having a dry thickness of about 50 μm. The mass average molecular weight of the SEEPS was 260,000 and the styrene content thereof was 30 mass %. The softening point of the alicyclic saturated hydrocarbon petroleum resin (a) was 100° C.

Production of a Hot Melt Adhesive Sheet According to Example 2

In addition to the SEEPS and the alicyclic saturated hydrocarbon petroleum resin (a), a terpene modified phenol resin was included in an organic solvent in a mixing amount shown in Table 1 below to prepare a varnish, followed by applying the varnish to a polyethylene terephthalate film in the same manner as in Example 1, to obtain a hot melt adhesive sheet including an adhesive layer having a dry thickness of about 50 μm. The softening point of the terpene modified phenol resin was 135° C.

Production of a Hot Melt Adhesive Sheet According to Example 3

A SEEPS and a styrene-ethylene-propylene-styrene block copolymer (SEPS) as styrene-based block copolymers, an alicyclic saturated hydrocarbon petroleum resin (b), and a terpene modified phenol resin were included in an organic solvent in mixing amounts shown in Table 1 below to prepare a varnish, followed by applying the varnish to a polyethylene terephthalate film in the same manner as in Example 1, to obtain a hot melt adhesive sheet including an adhesive layer having a dry thickness of about 50 μm. The mass average molecular weight of the SEPS was 250,000 and the styrene content thereof was 20 mass %. The softening point of the alicyclic saturated hydrocarbon resin (b) was 115° C.

Production of a Hot Melt Adhesive Sheet According to Example 4

A styrene-ethylene-propylene-styrene block copolymer (SEPS) as a styrene-based block copolymer, an alicyclic saturated hydrocarbon petroleum resin (b), and a terpene modified phenol resin were included in an organic solvent in mixing amounts shown in Table 1 below to prepare a varnish, followed by applying the varnish to a polyethylene terephthalate film in the same manner as in Example 1, to obtain a hot melt adhesive sheet including an adhesive layer having a dry thickness of about 50 μm.

Production of a Hot Melt Adhesive Sheet According to Comparative Example 1

A styrene-ethylene-butylene-styrene block copolymer (SEBS) as a styrene-based block copolymer, an alicyclic saturated hydrocarbon petroleum resin (c), a hydrogenated aromatic hydrocarbon petroleum resin, and a hydrogenated terpene resin were included in an organic solvent in mixing amounts shown in Table 1 below to prepare a varnish, followed by applying the varnish to a polyethylene terephthalate film in the same manner as in Example 1, to obtain a hot melt adhesive sheet including an adhesive layer having a dry thickness of about 50 μm. As the SEBS used herein, a SEBS1 having a mass average molecular weight of 160,000 and a styrene content of 31%, a SEBS2 having a molecular weight of 57,000 and a styrene content of 30%, and a SEBS3 having a molecular weight of 70,000 and a styrene content of 30%, were mixed at a ratio of the respective mass parts (i.e., SEBS1:SEBS2:SEBS 3) is 100:60:40. The softening point of the alicyclic saturated hydrocarbon petroleum resin (c) was 115° C., the softening point of the hydrogenated terpene resin was 125° C., and the softening point of the hydrogenated aromatic hydrocarbon petroleum resin was 120° C.

Production of a Hot Melt Adhesive Sheet According to Comparative Example 2

A SEEPS as a styrene-based block copolymer and an alicyclic saturated hydrocarbon petroleum resin (b) were included in an organic solvent in mixing amounts shown in Table 1 below to prepare a varnish, followed by applying the varnish to a polyethylene terephthalate film in the same manner as in Example 1, to obtain a hot melt adhesive sheet including an adhesive layer having a dry thickness of about 50 μm.

(Measurement of Glass Transition Temperature)

A glass transition temperature was measured for a test specimen of the hot melt adhesive sheet according to each of Examples and Comparative Examples prepared to have an adhesive layer having a thickness of 0.5 mm or more. The glass transition temperature of each of the test specimens was measured using a viscoelasticity measuring device (Model No. MCR 302 manufactured by Anton Paar Japan K.K.). Specifically, each of the test specimens was applied with a load of 10N under an air atmosphere and a measurement was made using the viscoelasticity measuring device in the conditions of heating with a frequency of 1 Hz, a strain of 0.1%, and at a heating rate of 5° C./min within a temperature range between −70° C. and 200° C., to determine a glass transition temperature (Tg) from a position of tans peak. Table 1 below shows the glass transition temperature (Tg) of the hot melt adhesive sheet according to each of Examples and Comparative Examples measured as described above.

(Peel Test Under a Room Temperature Environment)

A strip-shaped sample having a width of 10 mm was cut out from the hot melt adhesive sheet according to each of Examples and Comparative Examples. Next, the adhesive layer of the strip-shaped sample was thermally adhered to a surface of an adherend by heat pressing (pressure: 0.2 MPa, temperature: 60° C., time: 5 sec.) and sufficiently cooled to reach a room temperature to obtain a test specimen. Then, a 180 degree peel test was performed by pulling the hot melt adhesive sheet from the adherend using a tensile tester at a test speed of 300 mm/min in a room temperature environment (23° C.) to determine a peel strength (N/10 mm) in a room temperature environment. A PP (polypropylene resin) plate, a PI (polyimide resin) plate, a PC (polycarbonate resin) plate, an AC (acrylic resin) plate, a PET-G (glycol modified polyethylene terephthalate resin) plate, an ABS resin plate, a PVC (polyvinyl chloride resin) plate, a PS (polystyrene resin) plate, a SUS plate, an Al (aluminum) plate, a Cu (copper) plate, and a glass plate were used as the adherend. Table 1 below shows the peel strength of the hot melt adhesive sheet according to each of Examples and Comparative Examples measured as described above.

TABLE 1

| | | | Ex. 1 | Ex. 2 | Ex. 3 | Ex. 4 | C. Ex. 1 | C. Ex. 2 |
|---|---|---|---|---|---|---|---|---|
| Mixing amount (Mass parts) | Styrene-based block copolymer | SEEPS | 100 | 100 | 50 | | | 100 |
| | | SEPS | | | 50 | 100 | | |
| | | SEBS | | | | | 200 | |
| | Hydrogenated hydrocarbon petroleum resin | Hydrogenated alicyclic saturated hydrocarbon petroleum resin (a) | 80 | 80 | | | | |
| | | (b) | | | 80 | 80 | | 160 |
| | | (c) | | | | | 60 | |
| | | Hydrogenated aromatic hydrocarbon petroleum resin | | | | | 20 | |

TABLE 1-continued

|  |  | Ex. 1 | Ex. 2 | Ex. 3 | Ex. 4 | C. Ex. 1 | C. Ex. 2 |
|---|---|---|---|---|---|---|---|
| Terpene modified phenol resin |  |  | 10 | 10 | 10 |  |  |
| Hydrogenated terpene resin |  |  |  |  |  | 100 |  |
| Glass transition temperature (Tg) |  | −1 | −4 | 5 | −1 | 4 | 37 |
| Adherend | PP | 9.71 | 11.28 | 10.65 | 10.40 | 8.01 | 12.76 |
|  | PI | 8.95 | 10.28 | 11.40 | 10.30 | 5.98 | 7.07 |
|  | PC | 9.67 | 11.71 | 10.20 | 10.94 | 3.57 | 9.64 |
|  | AC | 9.55 | 11.45 | 10.79 | 11.01 | 8.18 | 7.75 |
|  | PET-G | 9.15 | 11.68 | 11.27 | 10.69 | 7.26 | 9.67 |
|  | ABS | 8.48 | 10.90 | 9.31 | 10.23 | 7.20 | 4.80 |
|  | PVC | 10.01 | 12.10 | 10.46 | 10.64 | 4.38 | 9.59 |
|  | PS | 9.21 | 10.30 | 9.61 | 10.09 | 7.00 | 6.20 |
|  | SUS | 8.20 | 11.85 | 11.84 | 10.60 | 8.21 | 6.69 |
|  | Al | 6.99 | 9.67 | 9.64 | 10.08 | 1.26 | 0.47 |
|  | Cu | 10.40 | 12.84 | 11.68 | 11.58 | 7.46 | 16.36 |
|  | Glass | 8.59 | 14.08 | 11.40 | 11.47 | 8.33 | 13.82 |

It can be seen from Table 1 that the hot melt adhesive sheets according to Examples 1 to 4 have a remarkably excellent adhesion when the adherend is an aluminum plate, compared with the hot melt adhesive sheets according to Comparative Examples 1 and 2.

The invention claimed is:

1. A hot melt adhesive sheet comprising an adhesive layer comprising a hot melt adhesive, wherein
the hot melt adhesive comprises a styrene-ethylene-ethylene-propylene-styrene block copolymer, a hydrogenated alicyclic hydrocarbon petroleum resin, and a terpene modified phenol resin,
the hot melt adhesive comprises 20 mass parts or more and 80 mass parts or less of the hydrogenated alicyclic hydrocarbon petroleum resin based on 100 mass parts of the styrene-ethylene-propylene-styrene block copolymer,
the hot melt adhesive comprises 3 mass parts or more and 15 mass parts or less of the terpene modified phenol resin based on 100 mass parts of the styrene-ethylene-propylene-styrene block copolymer, and
the hot melt adhesive sheet has a glass transition temperature falling within a range of −10° C. or more and −4° C. or less.

2. The hot melt adhesive sheet according to claim 1, wherein a styrene content in the styrene-ethylene-ethylene-propylene-styrene block copolymer is 15 mass % or more.

3. The hot melt adhesive sheet according to claim 1, wherein a softening point of the hydrogenated alicyclic hydrocarbon petroleum resin is 140° C. or less.

4. The hot melt adhesive sheet according to claim 1, wherein a softening point of the terpene modified phenol resin is 100° C. or more.

* * * * *